United States Patent
Khalifa et al.

(10) Patent No.: US 9,132,619 B2
(45) Date of Patent: Sep. 15, 2015

(54) HIGH DURABILITY JOINTS BETWEEN CERAMIC ARTICLES, AND METHODS OF MAKING AND USING SAME

(71) Applicant: General Atomics, San Diego, CA (US)

(72) Inventors: Hesham Ezzat Khalifa, La Jolla, CA (US); Christian Peter Deck, San Diego, CA (US); Christina Allyssa Back, San Diego, CA (US)

(73) Assignee: General Atomics, San Diego, CA (US)

( * ) Notice: Subject to any disclaimer, the term of this patent is extended or adjusted under 35 U.S.C. 154(b) by 5 days.

(21) Appl. No.: 13/856,919

(22) Filed: Apr. 4, 2013

(65) Prior Publication Data
US 2013/0266363 A1    Oct. 10, 2013

Related U.S. Application Data
(60) Provisional application No. 61/620,895, filed on Apr. 5, 2012.

(51) Int. Cl.
*B32B 37/16* (2006.01)
*C04B 35/571* (2006.01)
(Continued)

(52) U.S. Cl.
CPC .............. *B32B 37/16* (2013.01); *C04B 35/571* (2013.01); *C04B 35/6267* (2013.01); *C04B 35/6269* (2013.01); *C04B 35/62802* (2013.01);
(Continued)

(58) Field of Classification Search
CPC   C04B 35/565; C04B 35/571; C04B 35/6267; C04B 35/6269; C04B 2235/3834; C04B 2235/762; C04B 2237/083; C04B 2237/365; B32B 37/24; B32B 37/06; B32B 37/12; B32B 18/00
USPC ........................................ 156/89.11, 283, 326
See application file for complete search history.

(56) References Cited

U.S. PATENT DOCUMENTS

| | | | |
|---|---|---|---|
| 4,070,197 A | | 1/1978 | Coes |
| 4,921,554 A | * | 5/1990 | Bates et al. ................ 156/89.23 |

(Continued)

FOREIGN PATENT DOCUMENTS

| | | | |
|---|---|---|---|
| JP | 2007-191329 A | | 8/2007 |
| JP | 2007191329 A | * | 8/2007 |

(Continued)

OTHER PUBLICATIONS

Delhaes, "Chemical vapor deposition and infiltration processes of carbon materials", Carbon 40 (2002), pp. 641-657.*

(Continued)

*Primary Examiner* — Alex Efta
(74) *Attorney, Agent, or Firm* — Jones Day; Jaime D. Choi (57) ABSTRACT

Embodiments of the present invention provide high durability joints between ceramic articles, particularly between beta-silicon carbide (β-SiC) articles, and methods of making and using the same. In one embodiment, a joint between first and second articles each comprising a ceramic polymorph comprises a matrix comprising the ceramic polymorph and extending between the first and second articles; a plurality of inclusions comprising the ceramic polymorph and being distributed throughout the matrix; and a sealing layer comprising the ceramic polymorph and being respectively disposed on the first and second articles and the matrix.

12 Claims, 9 Drawing Sheets

(51) Int. Cl.

| | |
|---|---|
| *C04B 35/626* | (2006.01) |
| *C04B 35/628* | (2006.01) |
| *C04B 37/00* | (2006.01) |
| *B32B 37/24* | (2006.01) |
| *B32B 37/06* | (2006.01) |
| *B32B 37/12* | (2006.01) |
| *B32B 18/00* | (2006.01) |
| *C04B 35/565* | (2006.01) |

(52) U.S. Cl.
CPC ......... *C04B35/62839* (2013.01); *C04B 37/005* (2013.01); *B32B 18/00* (2013.01); *B32B 37/06* (2013.01); *B32B 37/12* (2013.01); *B32B 37/24* (2013.01); *C04B 35/565* (2013.01); *C04B 2235/3834* (2013.01); *C04B 2235/483* (2013.01); *C04B 2235/5276* (2013.01); *C04B 2235/5296* (2013.01); *C04B 2235/72* (2013.01); *C04B 2235/723* (2013.01); *C04B 2235/762* (2013.01); *C04B 2235/96* (2013.01); *C04B 2237/06* (2013.01); *C04B 2237/062* (2013.01); *C04B 2237/064* (2013.01); *C04B 2237/066* (2013.01); *C04B 2237/068* (2013.01); *C04B 2237/08* (2013.01); *C04B 2237/083* (2013.01); *C04B 2237/34* (2013.01); *C04B 2237/341* (2013.01); *C04B 2237/343* (2013.01); *C04B 2237/345* (2013.01); *C04B 2237/346* (2013.01); *C04B 2237/348* (2013.01); *C04B 2237/365* (2013.01); *C04B 2237/368* (2013.01); *C04B 2237/708* (2013.01); *C04B 2237/88* (2013.01); *Y10T 403/477* (2015.01)

(56) References Cited

U.S. PATENT DOCUMENTS

| | | | |
|---|---|---|---|
| 5,374,412 A * | 12/1994 | Pickering et al. ............. 423/346 |
| 6,133,396 A | 10/2000 | Laine et al. |
| 6,692,597 B2 | 2/2004 | Mako et al. |
| 6,758,386 B2 | 7/2004 | Marshall et al. |
| 2004/0154725 A1 | 8/2004 | Mako et al. |
| 2007/0221326 A1 | 9/2007 | Rowan et al. |
| 2008/0078501 A1 | 4/2008 | Li et al. |
| 2008/0138568 A1 * | 6/2008 | Tomita et al. ................ 428/116 |
| 2008/0226868 A1 * | 9/2008 | Pickering et al. ............. 428/119 |
| 2009/0032178 A1 * | 2/2009 | Feinroth ....................... 156/143 |
| 2009/0264273 A1 * | 10/2009 | Riedell et al. .................. 501/91 |
| 2011/0073236 A1 * | 3/2011 | Lee ................................ 156/60 |
| 2011/0236627 A1 | 9/2011 | Kanai |

FOREIGN PATENT DOCUMENTS

| | | | |
|---|---|---|---|
| JP | 2007-246319 A | | 9/2007 |
| JP | 2007246319 A | * | 9/2007 |
| JP | 2008-162879 A | | 7/2008 |
| JP | 2010-018448 A | | 1/2010 |
| JP | 2010018448 A | * | 1/2010 |

OTHER PUBLICATIONS

Yokoyama, "JP 2010-018448, machine translation", published Jan. 28, 2010.*
Umetsu et al., "JP 2007-246319, machine translation", published Sep. 27, 2007.*
Bandai et al., "JP 2007-191329, machine translation", published Aug. 2, 2007.*
Causey and Wampler, "The use of silicon carbide as a tritium permeation barrier," *J. Nucl. Mater.* 220-222:823-826 (1995).
Colombo et al., "Joining of SiC/SiC$_f$ ceramic matrix composites for fusion reactor blanket applications," *J. Nucl. Mater.* 278:127-135 (2000).
Ferraris et al., "Glass-ceramic joining and coating of SiC/SiC for fusion applications," *J. Nucl. Mater.* 258-263:1546-1550 (1998).
Harrison and Marcus, "Gas-phase Selective Area Laser Deposition (SALD) joining of SiC," *Mater. Des.* 20:147-153 (1999).
Lewinsohn et al., "Silicon carbide-based materials for joining silicon carbide composites for fusion energy applications," *J. Nucl. Mater.* 307-311:1232-1236 (2002).
Pitcher et al., "Smooth Continuous Films of Stoichiometric Silicon Carbide from Poly(methylsilyne)," *Adv. Mater.* 16(8):706-709 (2004).
Pouskouleli, "Metallorganic Compounds as Preceramic Materials I. Non-Oxide Ceramics," *Ceram. Int.* 15:213-229 (1989).
Riccardi et al., "Issues of low activation brazing of SiC$_f$/SiC composites by using alloys without free silicon," *J. Nucl. Mater.* 329-333:562-566 (2004).
Snead et al., "Handbook of SiC properties for fuel performance modeling," *J. Nucl. Mater.* 371:329-377 (2007).
Snead et al., "Silicon carbide composites as fusion power reactor structural materials," *J. Nucl. Mater.* 417:330-339 (2011).
Laine et al., "Preceramic Polymer Routes to Silicon Carbide," *Chem. Mater.* 5:260-279 (1993).
Japanese Patent Office, Office Action for related application JP 2013-079992 with English translation, mailed Mar. 3, 2015.

* cited by examiner

HIGH DURABILITY JOINTS BETWEEN CERAMIC ARTICLES, AND METHODS OF MAKING AND USING SAME

CROSS-REFERENCE TO RELATED APPLICATION

This application claims the benefit of U.S. Provisional Patent Application No. 61/620,895, filed Apr. 5, 2012 and entitled "High Durability Joints Between Ceramic Articles, and Methods of Making and Using Same," the entire contents of which are incorporated by reference herein.

FIELD OF THE INVENTION

This application generally relates to joints between ceramic articles, particularly joints between silicon carbide articles, and methods of making and using the same.

BACKGROUND OF THE INVENTION

There are many types of silicon carbide (SiC) that have different chemical, physical, and structural characteristics that arise from the type of processing used to prepare it. Known techniques for preparing SiC articles include chemical vapor deposition (CVD), reaction bonding, sintering, hot pressing, foaming. Another more recently developed method of preparing SiC articles is pyrolysis, in which a silicon-containing polymer such as poly(methylsilane) is formed into a desired shape and then thermally decomposed in an inert atmosphere. Each processing technique may generate one or more specific crystal structures, also referred to as "polymorphs," "polytypes," or "phases," e.g., cubic (zinc blende) or hexagonal crystal structures, which have different characteristics from one another.

Articles of the cubic polymorph of silicon carbide, known as beta-SiC or β-SiC, may be prepared using CVD and pyrolysis, for example. β-SiC is useful for certain applications because it has a relatively high thermal conductivity, a relatively low coefficient of thermal expansion, is relatively stable to chemicals and oxidation, and is relatively heat stable, hard, scratch resistant, electrically resistive, and resistant to radiation damage, as compared to other SiC polymorphs.

Recent concerns over nuclear fission reactor safety have led to interest in β-SiC-based materials for structural components in the nuclear reactor. Beta-SiC is an appealing nuclear material because it retains its strength at elevated temperatures, and is highly resistant to irradiation induced damage. For example, SiC fiber reinforced-SiC matrix ($SiC_f/SiC_m$) composites are an appealing structural material because they retain the desirable properties of monolithic SiC, and additionally exhibit graceful failure by pseudo-ductility associated with fiber-matrix interactions. A target application for SiC-based materials is as a fuel clad replacement for Zircaloy. A successful fuel clad must retain the fuel and fission products formed through the fuel cycle. The successful implementation of SiC-based materials in advanced reactor designs, therefore, hinges on the development of a mechanically robust joint that will adequately retain nuclear fuel within the SiC-based cladding throughout the fuel's operating cycle.

In particular, a nuclear grade joint must meet the same rigorous requirements as the SiC-based articles themselves. Furthermore, it must have well-matched thermal and irradiation induced dimensional change to the articles, as well as chemical compatibility with the fuel, fission products, and coolant. Purity and structure both play important roles in material performance in nuclear environments. High oxygen levels, and finely grained crystalline structures, in particular, lead to poor irradiation performance due to irradiation induced swelling.

Various methods have been developed to join articles of silicon carbide. For example, U.S. Patent Application No. 2008/0226868 to Pickering describes joining silicon carbide using sintered ceramics and CVD. Specifically, a ceramic is applied to the joint in the form of a paste, sol, or slurry including, e.g., 75 wt % silicon carbide powder, 7 wt % methyl cellulose as a binder, and 18 wt % water, and then sintered between 1500-2100° C. to solidify the joint. This initial joint material is α-SiC, a polytype with comparably poorer irradiation performance to β. A coating of CVD β-SiC is then optionally deposited on the joint. However, such a slurry may cause an unacceptably high amount of water (and particularly oxygen in the water) to remain in the joint, thus rendering the joint susceptible to further changes such as irradiation induced swelling, and creating a risk of contaminating nuclear fuel or other materials in the environment.

Ferraris et al., "Glass ceramic coating and joining of SiC/SiC for fusion applications," *Journal of Nuclear Materials*, 258-263 (1998) pages 1546-1550, describes using a hybrid calcia-alumina (CA) glass-ceramic to join composite articles in combination with the application of either chemical vapor infiltration (CVI) or polymer infiltration pyrolysis (PIP) of SiC. However, the CA glass-ceramic has a different composition than SiC, and thus has different characteristics than SiC that may cause premature degradation of the joint over the course of the typical nuclear refueling cycle. The use of dissimilar joining materials such as glass ceramics is particularly concerning for the case of convert and burn high temperature, gas cooled fast reactors, which are designed for significantly longer refueling lifetime.

Lewinsohn et al., "SiC-based materials for joining SiC composites in fusion energy applications," *Journal of Nuclear Materials*, 307-311 (2002) pages 1232-1236, describes joining silicon carbide composites by applying to the joint a mixture of hydridopolycarbosilane (HPCS, a preceramic polymer) with about 3 vol % allyl groups to promote cross-linking and 42 wt % SiC powder (F800 powder from UK Abrasives, Lot No. SZ0802A7), followed by pyrolyzing the polymer. Lewinsohn describes that the joint then was re-impregnated with polymer and pyrolyzed again. However, Lewinsohn observed cracks in the joints that would limit the strength and permit environmental degradation of the joints.

Harrison et al., "Gas-phase selected area laser deposition (SALD) joining of SiC," *Materials and Design*, 20 (1999) pages 147-152, describes joining together ceramic articles with ceramic filler material using SALD, in which a high-powered laser beam is used to induce a thermal decomposition reaction of gases inside a vacuum chamber, leading to a desired solid product deposited inside the laser spot heated zone. Harrison discloses that the hermetic seals of the tested joint structures were within approximately an order of magnitude of the monolithic articles, and that the deposited material had relatively hard regions of high purity silicon carbide as well as regions of very soft deposited material. Such weak seals and soft material are clearly unsuitable for use in the harsh environment of a nuclear reactor.

As such, previously-known methods may be insufficient to prepare joints having adequate durability for use in environments that may place a great deal of thermal, mechanical, electrical, chemical, and/or radiological stress on the joint.

Accordingly, there is a need for improved joints between silicon carbide articles, particularly between articles formed of β-SiC and intended for use in environments that may place a great deal of thermal, mechanical, electrical, chemical, and/or radiological stress on the joint, such as in a nuclear reactor.

SUMMARY OF THE INVENTION

Embodiments of the present invention provide high durability joints between ceramic articles, particularly between β-SiC articles, and methods of making and using the same. Preferably, such joints have substantially the same composition as the articles being joined, and thus have substantially the same mechanical strength, thermal expansion coefficient, and other characteristics as the articles being joined. As such, the joints may have enhanced durability in harsh environments, such as a nuclear reactor, in which they may be subjected to a great deal of thermal, mechanical, and other stresses, as well as radiation.

Under one aspect of the present invention, a joint between first and second articles each comprising a ceramic polymorph comprises: a matrix comprising a ceramic polymorph and extending between the first and second articles; a plurality of inclusions comprising a ceramic polymorph and being distributed throughout the matrix; and a sealing layer comprising a ceramic polymorph and being respectively applied to the joint surfaces of the first and second articles and the matrix. The matrix may be polymer-derived, while the sealing layer may be CVI-derived.

The matrix, the plurality of inclusions, and the sealing layer each may consist essentially of the ceramic polymorph. The first and second articles also may each consist essentially of the ceramic polymorph.

The sealing layer may partially extend into the matrix, and may have a penetration depth, observed in some examples of up to 10.0 mm.

The joint may have substantially the same composition as each of the first and second articles, may have substantially the same mechanical strength as each of the first and second articles, and/or may have substantially the same thermal expansion coefficient as each of the first and second articles, and/or may be hermetic.

The ceramic polymorph may be, for example, β-SiC. The matrix, the plurality of inclusions, and the sealing layer each may comprise more than 99.0 wt % β-SiC, or even more than 99.7 wt % β-SiC. The joint may have a characteristic apparent shear strength of at least 1 MPa, or of at least 50 MPa, for example.

Under another aspect of the present invention, a method of preparing a joint between first and second articles each comprising a ceramic polymorph includes: (a) preparing a slurry comprising a preceramic polymer and a plurality of inclusions; (b) applying the slurry between the first and second articles; (c) curing the slurry to form a green body; (d) pyrolyzing the green body to form a solid ceramic containing the plurality of inclusions; (e) converting the solid ceramic to a matrix comprising a crystallized ceramic polymorph and having the plurality of inclusions therein; and (f) reinforcing the joint by applying a sealant layer, which in one example is performed using chemical vapor infiltration to form a layer comprising a ceramic polymorph on the first and second articles and infiltrated into the matrix. Such reinforcement may densify and seal the joint by penetrating into the matrix, filling voids therein and improving the mechanical strength of the matrix, and then by depositing on an outer surface of the joint. Optionally, steps (b)-(e) may be repeated one or more additional times.

The matrix, the plurality of inclusions, and the sealing layer each may consist essentially of the same ceramic polymorph. The inclusions may comprise whiskers of the ceramic polymorph, and may be present at significant mass % in the slurry.

The matrix, the plurality of inclusions, and the sealing layer each may consist of one or more different ceramic polymorphs, or even one or more different materials, than one another.

The slurry may be cured at a first temperature to form the green body, the green body pyrolyzed at a second temperature higher than the first to form the solid ceramic, and the solid ceramic crystallized at an even higher temperature.

The preceramic polymer may comprise polycarbosilane and/or applying the chemical vapor infiltration may comprise applying methyltrichlorosilane in a carrier gas to the first and second articles and the matrix. In an illustrative embodiment, the ceramic polymorph is β-SiC.

DETAILED DESCRIPTION

Embodiments of the present invention provide sealed joints that have ceramic compositions—and thus mechanical, thermal, and other properties—that are substantially the same as the ceramic articles they join. Such joints were developed responsive to a need in the art to provide joints suitable for use in the harsh environment of a nuclear reactor, where heat or neutron fluence may cause materials having even slightly different properties to undergo differential dimensional change at the joint interface. Such change, if present, could weaken the joint, degrade performance, and even lead to catastrophic failure. By comparison, the inventive joints may be sealed, have a density approaching that of the articles, substantially the same properties as the articles, and may satisfactorily perform in a harsh environment for a desired amount of time, such as 4 years or longer, without substantial degradation in performance. One specific example of a material for which such a joint suitably may be prepared is β-SiC, which retains its strength even at high temperature and neutron fluence, and exhibits low thermal and neutron-induced expansion. Thus, with proper preparation, the joint (and joined articles) comprised primarily of β-SiC may exhibit a desirable combination of fracture toughness, shear strength, impermeability, and resistance to neutron damage.

First, an overview of joints that may be prepared according to the present invention will be provided. Then, a method for preparing such joints will be described. Thereafter, further details on structures that may be formed during various steps of that method will be provided. Lastly, some alternative embodiments will be described.

Figure 1A:
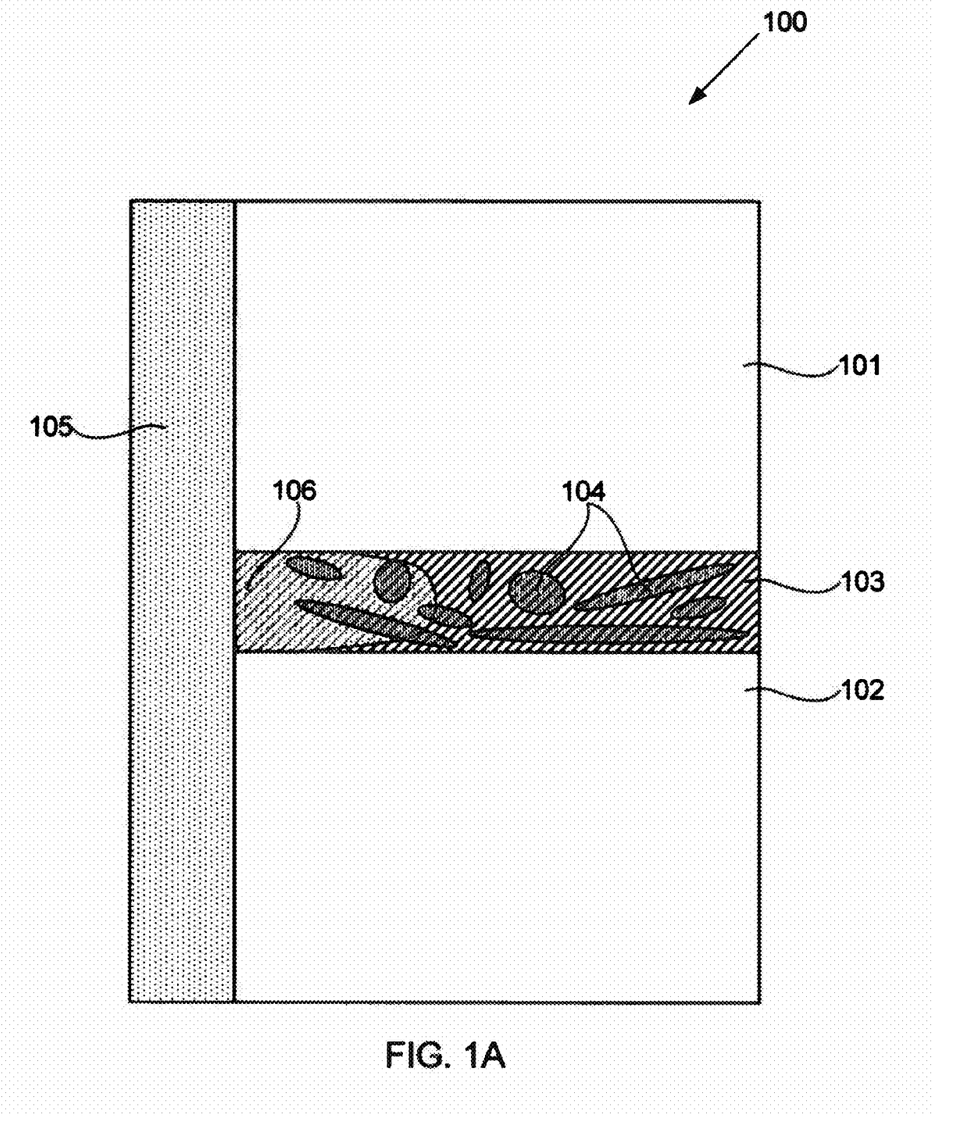
FIG. 1A schematically illustrates a cross-section of a joint prepared according to one or more embodiments of the present invention.

FIG. 1A schematically illustrates a cross section of joint 100 in which first and second articles 101, 102 are joined together by matrix 103, which has plurality of inclusions 104, and over which sealing layer 105 is disposed. In one example, matrix 103 is substantially the same material as articles 101, 102, e.g., has substantially the same stoichiometric composition and is the same polymorph as the articles. A plurality of inclusions 104 are distributed throughout matrix 103, and also may be substantially the same material as articles 101, 102. As described in greater detail below with reference to FIG. 1C, inclusions 104 may have a variety of shapes and sizes, and may serve to densify matrix 103. For example, absent inclusions 104, matrix 103 may otherwise have numerous cracks and voids that form during the formation of joint 100. Inclusions 104 may occupy and/or prevent the development of at least some of such cracks and voids, thus increasing the overall density of joint 100 and improving the joint's strength and durability. Sealing layer 105 is disposed over matrix 103, as well as over at least a portion of articles 101, 102. Sealing layer 105 additionally may penetrate partially or fully into matrix 103 as shown in region 106, as well as into the articles themselves. In one example, sealing layer 105 is substantially the same material as articles 101, 102. In one illustrative embodiment, first and second articles 101, 102, matrix 103, inclusions 104, and sealing layer 105 are all formed of, or alternatively consist essentially of, the same ceramic polymorph as one another, for example β-SiC.

Indeed, in some embodiments, matrix 103, inclusions 104, and sealing layer 105 are substantially pure. For example, each of these three elements may be at least about 99% pure (e.g., at least 99% β-SiC), or at least about 99.7% pure (e.g., at least 99.7% β-SiC). Preferably, each of these three elements has a purity that is similar to that of the articles themselves. It is believed that for nuclear applications, such high levels of purity are desirable because it may inhibit corrosion, differential radiation-induced swelling, and mechanical stresses caused by thermal expansion coefficient mismatch. Matrix 103, inclusions 104, and sealing layer 105 also preferably have a density approaching that of articles 101, 102, that is, a density that is within 10% of the articles. Note that the density of joint 100 may be highest in region 106, where sealing layer 105 penetrates into matrix 103 and thus fills any residual cracks or voids. The extent to which sealing layer 105 penetrates into matrix 103 may be controlled as described further below. In regions of matrix 103 not penetrated by sealing layer 105, the density may be somewhat lower than in region 106; however, in those regions inclusions 104 may reinforce and densify matrix 103 such that joint 100 has satisfactory properties for use in a desired application.

Joint 100 may suitably be used in a variety of environments, including harsh environments where it may be subjected to extreme heat, electrical discharge, oxidizing or corrosive chemicals, and radiation. Examples of such environments may be found throughout the nuclear and aerospace industries where complex part geometries are desirably able to operate for long periods of time and without degradation in performance, such as rocket nozzles, nuclear fuel cladding, turbine blades, thermal protection systems, heat exchangers, and the like.

Figure 1B:
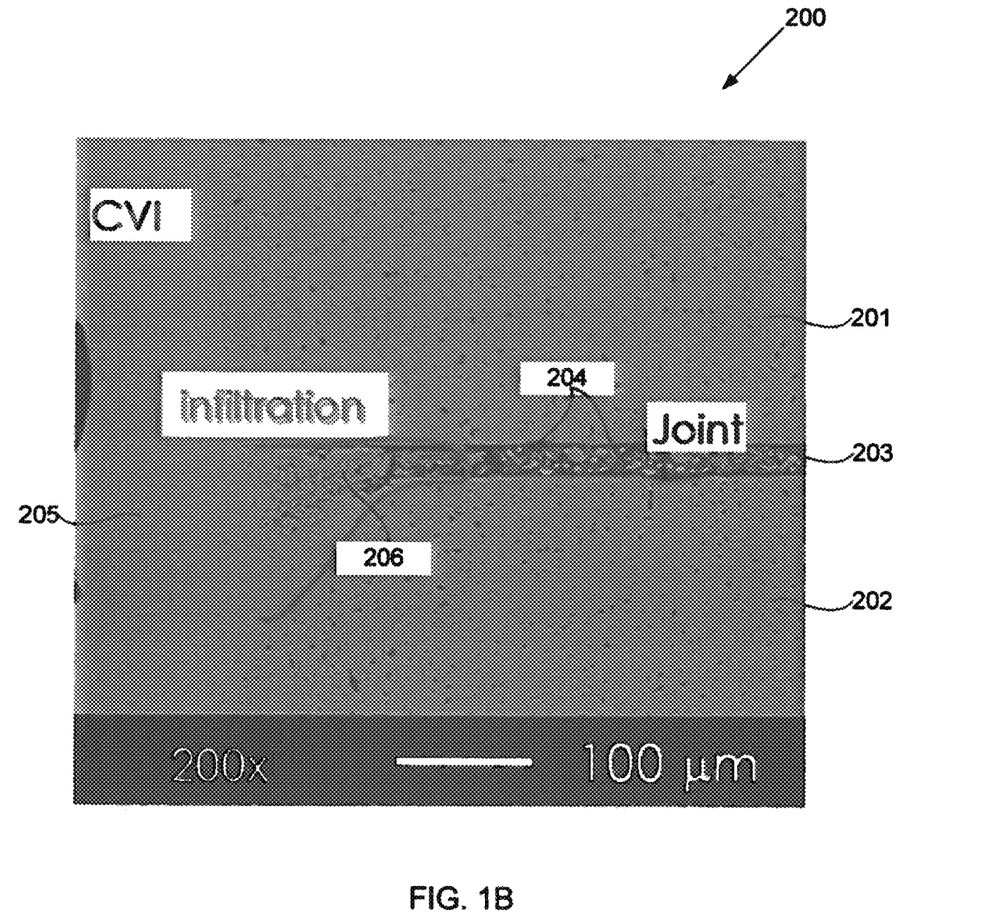
FIG. 1B is a microscope image of a cross-section of a beta-silicon carbide (β-SiC) joint prepared according to one illustrative embodiment of the present invention.

FIG. 1B is a scanning electron microscope (SEM) image of joint 200 between β-SiC articles 201, 202. Joint 200 includes matrix 203 of β-SiC disposed between articles 201, 202, and throughout which inclusions 204 are dispersed. Matrix 203 was formed by applying a slurry of the preceramic polymer with inclusions 204 dispersed therein between articles 201, 202, followed by pyrolysis and preferential conversion to the β-polymorph of SiC. Sealing layer 205, also designated "CVI," is a layer of β-SiC formed using chemical vapor infiltration, as described further below with respect to FIG. 1C. It may be seen in FIG. 1B that sealing layer 205 extends at least about 100 μm into matrix 203 within region 206, thus providing extra densification of matrix 203 in that region. It should be understood that region 206 may penetrate partially or fully into the joint upon suitable selection of processing parameters.

Figure 1C:
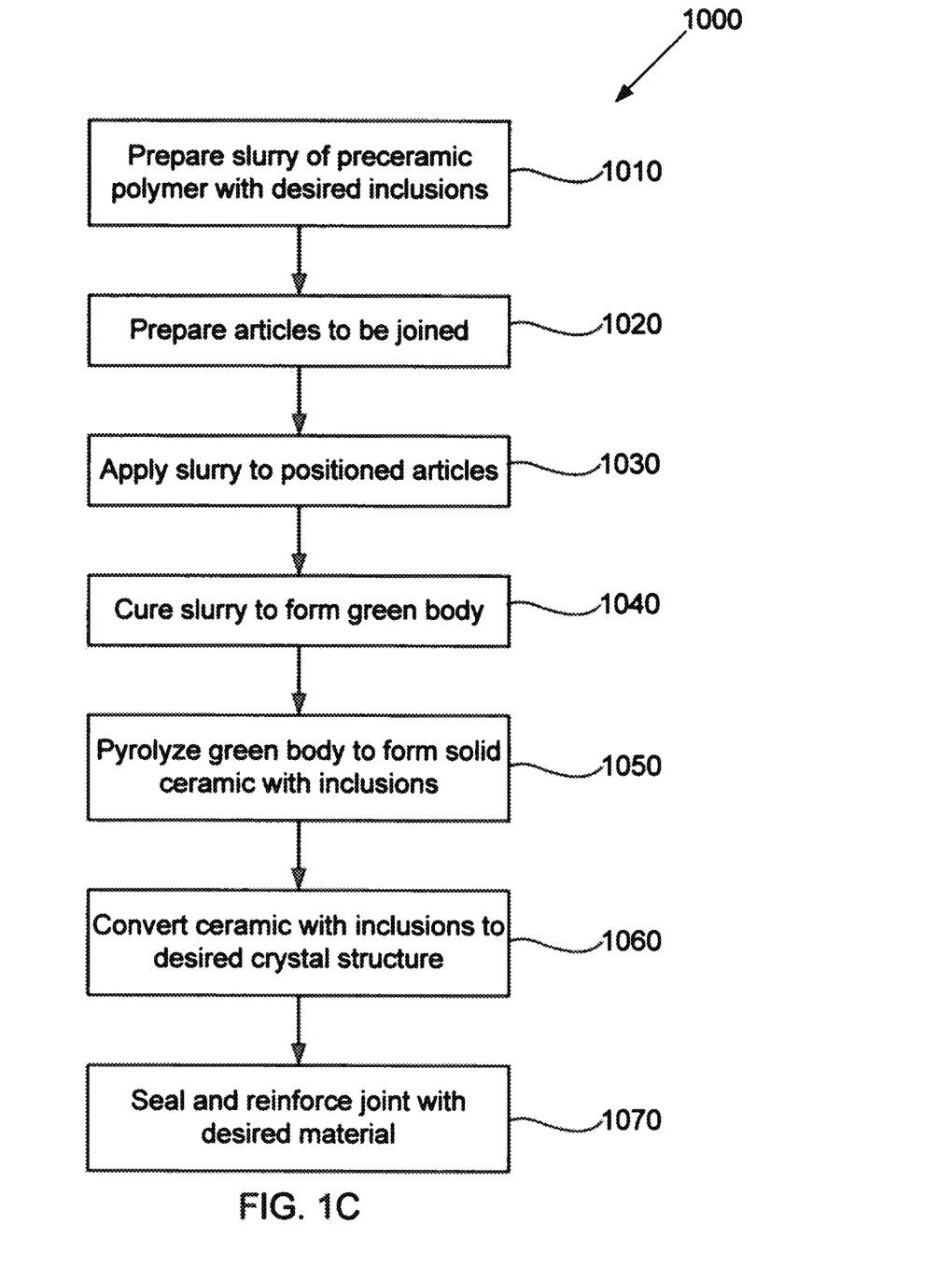
FIG. 1C illustrates steps in a method for preparing a joint according to one or more embodiments of the present invention.

Method 1000 of preparing joint 100 illustrated in FIG. 1A-1B will now be provided with respect to FIG. 1C.

Method 1000 includes preparing a slurry of preceramic polymer and inclusions of a desired ceramic polymorph (step 1010). The inclusions are preferably in the form of a powder that may readily be dispersed throughout the preceramic polymer, and may have a distribution of shapes and sizes and be provided in a desired mass % as described in greater detail below. In one illustrative embodiment, the preceramic polymer is polycarbosilane (PCS), which is a viscous liquid at room temperature, and the inclusions are in the form of a powder that, in one example, is SiC powder mixed with the liquid via mechanical mixing and ultrasonication.

The articles to be joined are then prepared (step 1020 of method 1000). For example, prior to joining, the articles may be cut and surface ground to the appropriate dimensions, and subsequently cleaned. Surface grinding and polishing may be performed using suitable methods known in the art, e.g., diamond suspensions and paired polishing cloths.

The slurry then is applied between the articles (step 1030 of method 1000). In some embodiments, the slurry is applied with a brush or spatula to one or both of the articles, and the articles then appropriately positioned relative to one another. Alternatively, one or both of the articles is dipped in the slurry, and the articles then appropriately positioned relative to one another.

The slurry is then cured to form a solid "green" body (step 1040 of method 1000).

The green body is then pyrolyzed to form a solid ceramic with inclusions embedded therein (step 1050 of method 1000). Depending on the particular preceramic polymer being used, such pyrolysis may include one or more intermediate steps.

Then, the solid ceramic is converted to the desired polymorph of the ceramic to form a matrix having inclusions embedded therein which may also be the same polymorph (step 1060 of method 1000). Depending on the particular ceramic material and polymorph, such conversion occurs substantially simultaneously with the pyrolysis step, or may be a subsequent step, e.g., heating to a higher temperature following pyrolysis. In some embodiments, the slurry may be cured at a first temperature to form the green body, the green body pyrolyzed at a second temperature higher than the first to form the solid ceramic, and the solid ceramic crystallized at a third temperature higher than the second temperature. In some cases multiple cycles of slurry application and pyrolysis are applied to improve joint density.

Lastly, the joint is sealed using chemical vapor infiltration (CVI) (step 1060). Suitable processes and chemicals for performing CVI that are known in the art, or are yet to be developed, may suitably be adapted to apply a sealing layer to the matrix formed in step 1050 and the first and second articles. The sealing layer may partially or fully penetrate a desired distance into matrix 103, e.g., 10-100%.

Further details on selected steps of method 1000 will now be provided with reference to FIGS. 2A-6B.

Figure 2A:
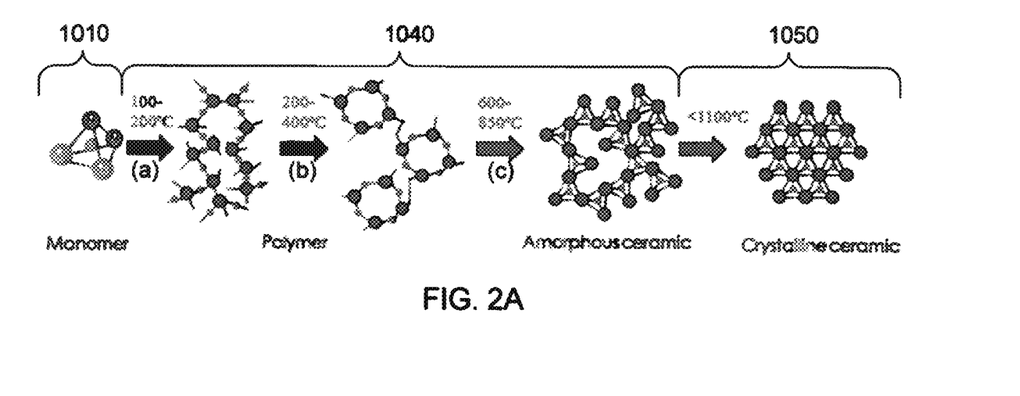
FIG. 2A schematically illustrates chemical reactions that may occur during intermediate steps in preparing a β-SiC joint according to the method of FIG. 1C.

FIG. 2A schematically illustrates intermediate structures prepared during steps 1010, 1050, and 1060 of method 1000. In the embodiment of FIG. 2A, the preceramic polymer provided in the slurry of step 1010 is illustratively PCS which is eventually converted to β-SiC. As discussed above with reference to step 1040 of method 1000, the slurry may be applied to the articles and cured to form a green body (not shown in FIG. 2A).

Then, as shown in FIG. 2A, during step 1050 the preceramic polymer is converted to a ceramic polymorph, which in the illustrated embodiment includes a first step (a) in which the monomers are polymerized at a relatively low temperature (e.g., 100° C.), a second step (b) in which the polymer is crosslinked at a higher temperature (e.g., 200-400° C.), and a third (c) step in which the polymer is pyrolyzed at a still higher temperature (e.g., 600-850° C.) resulting in formation of an amorphous ceramic.

Then, as shown in FIG. 2A, during step 1060 the amorphous ceramic is converted to a crystalline ceramic at a still higher temperature (e.g., greater than 1100° C.). Preferably, the temperature is selected so as to generate the desired polymorph of the ceramic.

Steps 1050 and 1060 are preferably performed in an inert atmosphere such as argon or vacuum. It should be appreciated that the conversion of preceramic polymer to ceramic matrix 103 is a thermally driven process that is highly dependent on processing parameters, and that the temperatures described above with reference to FIG. 2A may suitably be varied depending upon the particular preceramic polymer used and the desired ceramic polymorph to be formed. Preferably, the heating rate during these conversion steps is limited so as to inhibit the formation of gas bubbles, and in some embodiments is less than about 4° C. per minute.

Figure 2B:
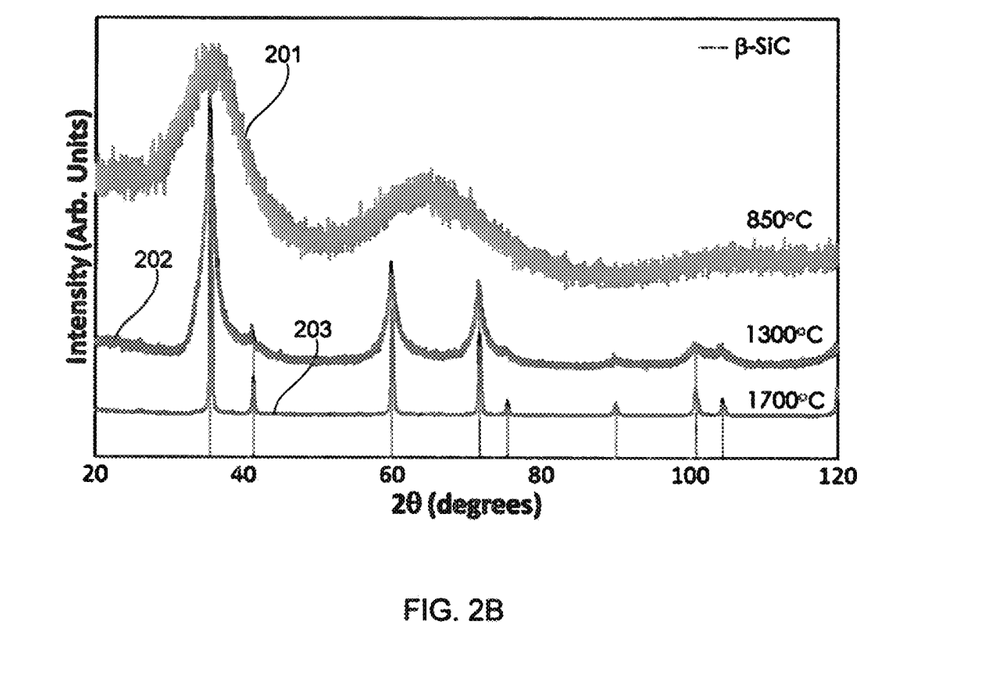
FIG. 2B is an intensity plot of X-ray diffraction (XRD) spectra of intermediate structures formed while preparing a β-SiC joint according to the method of FIG. 1C.

Additionally, even though crystallization of the solid amorphous ceramic may begin at a particular temperature (e.g., 1100° C. in FIG. 2A), to ensure complete crystallization to the desired polymorph it may be preferable to heat the ceramic to a significantly higher temperature for a prolonged period of time. For example, FIG. 2B is a plot of X-ray diffraction (XRD) spectra obtained at temperatures of 850° C. (spectrum 201), 1300° C. (spectrum 202), and 1700° C. (spectrum 203) during the conversion of PCS to β-SiC as described above with reference to FIGS. 1C and 2A. Spectrum 201 has relatively poorly resolved spectral features, reflecting the amorphous structure of the ceramic following pyrolysis. Spectrum 202 has sharper spectral features, reflecting a mean 10 nm grain size as determined using peak broadening analysis following Scherrer's method, which is well known in the art. Spectrum 203 has still sharper spectral features, reflecting a mean 100 nm grain size, again as determined using peak broadening analysis. It is believed that a larger crystal grain size, e.g., that develops based on prolonged processing at higher temperatures than nominally required to generate a particular polymorph, may be particularly well suited for use in nuclear applications because radiation may induce amorphization in finer crystal structures, resulting in poor mechanical performance. The sharp, well-resolved spectral features of spectrum 203 illustrate the high phase purity of the polymer-derived joint material prepared according to the above-described example. Note the excellent agreement with the theoretical line-outs for β-SiC, and the absence of any other crystallization peaks which would otherwise imply phase impurity.

The processing steps described above with reference to FIGS. 1C and 2A are shown to yield fully crystalline SiC, with extremely low oxygen levels as compared to those obtainable with previously known methods. Table 1 summarizes the results of a compositional analysis formed on β-SiC prepared based on PCS using the above-described methods in an argon or vacuum, as compared to the values reported by Pouskouleli et al., "Metallorganic compounds as preceramic materials I. Non-oxide ceramics," *Ceramics International* 15 (1989), pages 213-229). As can be seen in Table I, β-SiC formed according to the present invention shows a greater than 85% reduction in oxygen content as compared to the SiC reported by Pouskouleli. The oxygen levels and crystal size of the present β-SiC are believed to be well-suited for use in nuclear reactors, e.g., as fuel cladding. For example, such oxygen levels and crystal size are similar to those of the nuclear-grade SiC fiber, Tyranno SA3, which has demonstrated retention of its properties after exposure to high doses of neutron irradiation as reported by Snead et al., "Silicon carbide composites as fusion power reactor structural materials," *Journal of Nuclear Materials* 417 (2011) pages 330-338.

TABLE 1

| Element | % reported by Pouskouleli | % measured in β-SiC (argon) | % measured in β-SiC (vacuum) |
|---|---|---|---|
| Si | 48.8 | 49.8 | 49.8 |
| C | 48.8 | 49.9 | 49.9 |
| O | 2.4 | 0.35 | 0.19 |
| Zr | No data | <0.025 | <0.025 |
| TM | No data | <0.005 | <0.005 |

As noted above, adding inclusions 104 to the preceramic polymer during step 1010 of method 1000 may significantly increase the strength and durability of the finished joint 100 by increasing the density of matrix 103. For example, as the preceramic polymer is converted to matrix 103, it may contract and/or generate gases that form voids and cracks that would otherwise weaken joint 100. Inclusions 104 may be included in such proportion, and with such a distribution of shapes and sizes, as to substantially occupy voids and cracks in the joint and/or to substantially inhibit the formation of such voids and cracks that would otherwise result from such contraction. The inclusions may include spheres, flakes, whiskers, fibers, and/or irregular shapes of β-SiC having diameters and/or lengths in the range of nanometers to millimeters.

In one preferred embodiment, high aspect ratio inclusions 104 (e.g., having an aspect ratio of 1:2 or greater, or 1:5 or greater, or 1:10 or greater) are believed to be particularly useful for enhancing the mechanical strength and toughness of matrix 103. Specifically, "short" inclusions 104 that are shorter than a critical length to bridge a crack or gap may enhance the mechanical performance of joint 100 by resisting pull-out from the matrix as matrix 103 is subjected to fracture.

By comparison, "long" inclusions 104 which exceed the critical length necessary for enhanced mechanical performance of the joint, improve performance by bridging matrix cracks, subsequently sliding within the matrix, and then fracturing. An SEM image of high aspect ratio β-SiC nano-whiskers 304 that may suitably be used as inclusions 104 in matrix 103 is provided in FIG. 3A.

Figure 3A:
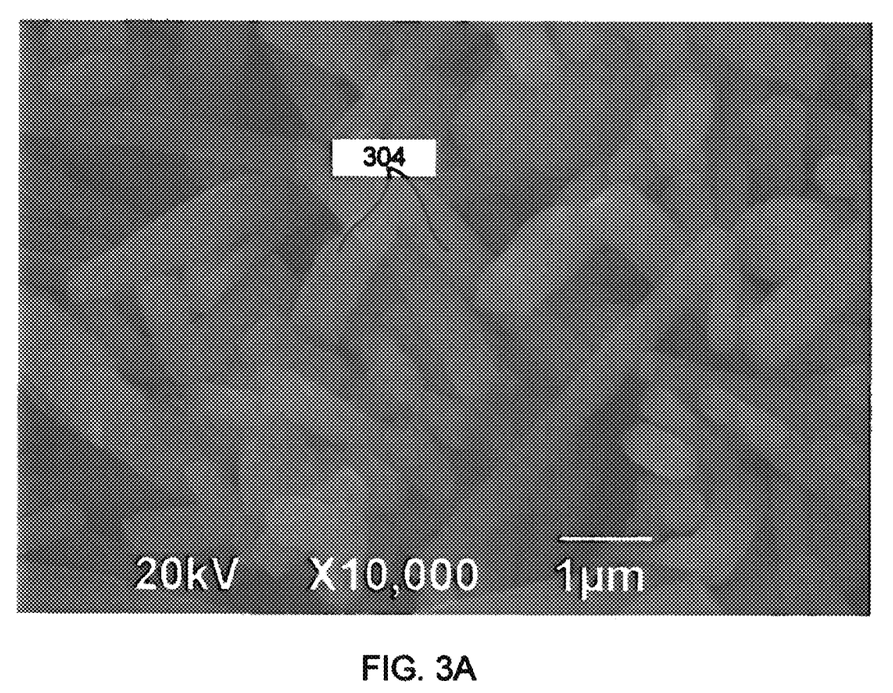
FIG. 3A is an electron microscope image of exemplary β-SiC inclusions that may be used in preparing a β-SiC joint according to one illustrative embodiment of the present invention.
Figure 3B:
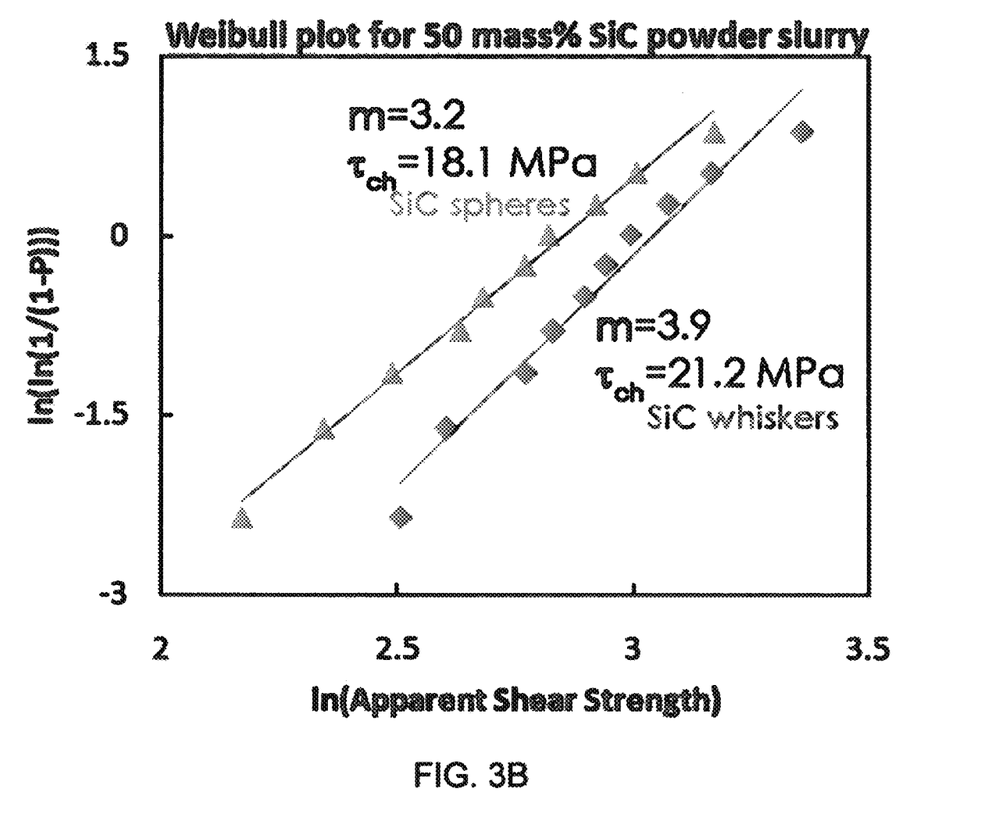
FIG. 3B is a Weibull plot illustrating the results for two different lengths of inclusions and apparent shear strength at an intermediate step of a β-SiC joint prepared according to the method of FIG. 1C.

The improved performance of high aspect ratio inclusions 104 may be seen in FIG. 3B, which is a Weibull plot illustrating the measured characteristic shear strength ($\tau_{ch}$) and Weibull modulus (m) for finished β-SiC joints formed using a slurry with different shapes of β-SiC inclusions 104, specifically either spheres (designated with triangles in FIG. 3B) or whiskers (designated with diamonds in FIG. 3B). As can be seen in FIG. 3B, the whiskers improve the characteristic shear strength ($\tau_{ch}$) and Weibull modulus (m) of the finished joints by about 17% and 21% respectively as compared to the spheres.

Figure 4A:
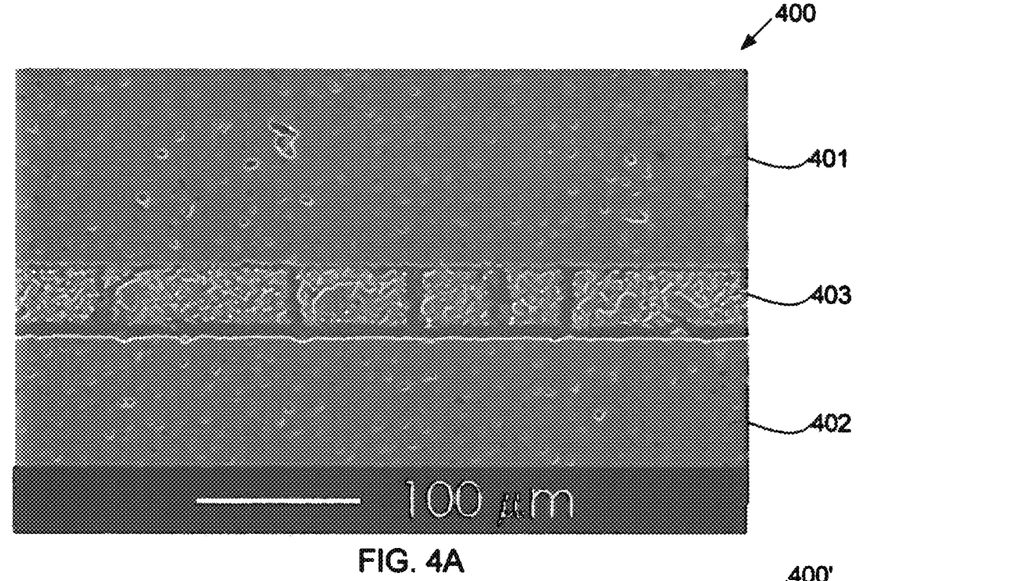
FIGS. 4A and 4B are microscope images of β-SiC joints respectively formed using spherical and whisker-shaped inclusions according to the method of FIG. 1C.
Figure 4B:
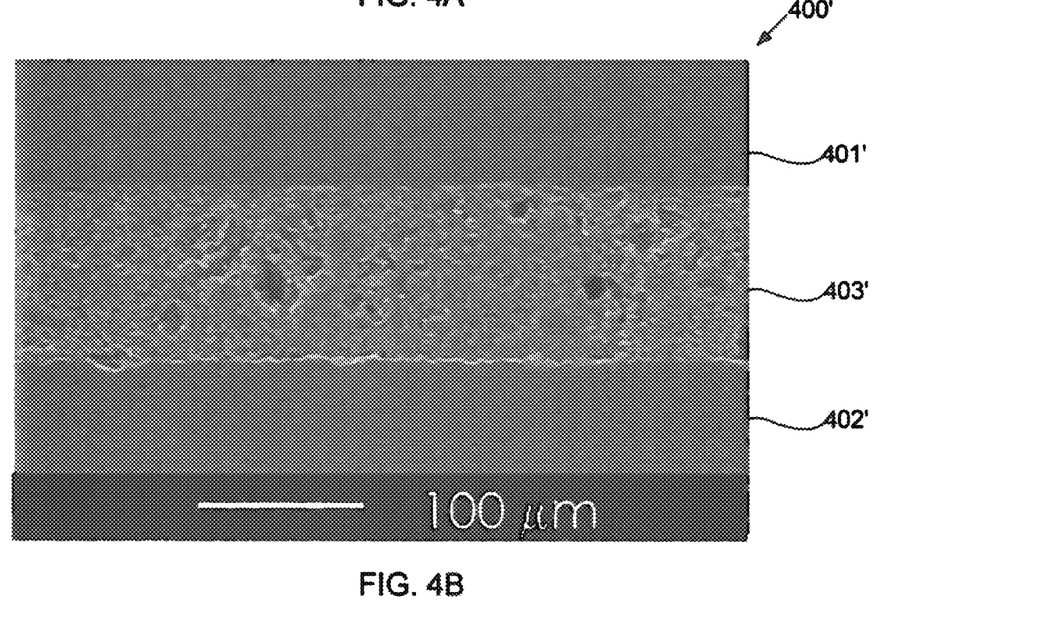

Changes in the size and morphology of cracks and voids may be seen in FIGS. 4A-4B, which are SEM images of finished β-SiC joints 400, 400' respectively prepared using spheres and whiskers of β-SiC. As can be seen in FIG. 4A, matrix 403 having spherical inclusions is disposed between first and second articles 401, 402 has several vertical cracks that span the joint thickness, while in FIG. 4B, matrix 403' having whisker-shaped inclusions is disposed between first and second articles 401', 402' and has smaller, rounder voids and a more homogeneous matrix. The size and shape of the inclusions may affect how volatile species evolve as the preceramic polymer is converted to a ceramic of desired polymorph (e.g., β-SiC), thus resulting in the different pore sizes and shapes in FIGS. 4A-4B. The spherical and whisker-shaped inclusions are not readily distinguishable in FIGS. 4A-4B as they have substantially the same composition as matrix 403, and are of considerably smaller dimension than the scale bar in the figures.

Figure 5:
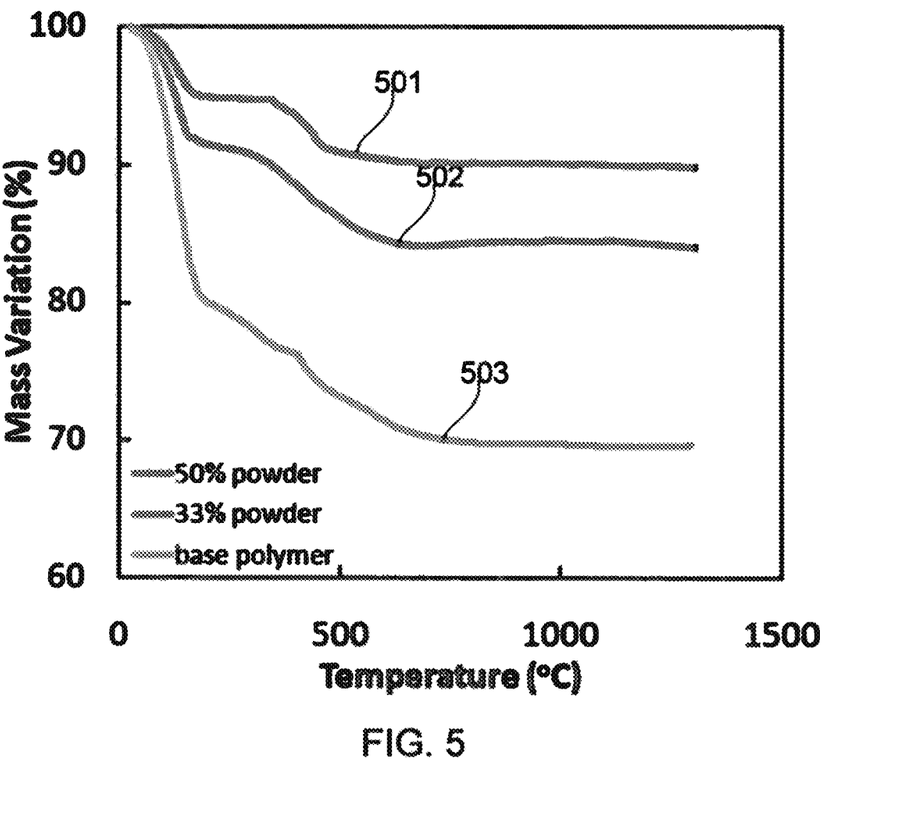
FIG. 5 is a plot that compares the characteristic apparent shear strength and Weibull modulus for different mixtures of polymer and inclusions at an intermediate step while preparing a β-SiC joint according to the method of FIG. 1C.

The loading fraction (also referred to as mass %) of inclusions 104 in the slurry of step 1010 of FIG. 1C may be selected depending on the particular application. In some embodiments, the mass % of inclusions may be between about 0.1% to about 90% or more, or between about 10% and about 80%, or between about 20% and about 70%, or between about 30% and about 60%, or between about 40% and about 50%. For example, FIG. 5 illustrates the percent mass variation in the ceramic as it is converted from preceramic polymer (e.g., at about 25° C.) to β-SiC (e.g., above about 850° C.) based on slurries that contain no inclusions ("base polymer"), contain 33 mass % of inclusions, and that contain 50 mass % of inclusions. The masses of the intermediate and final ceramics are normalized by the initial mass of the preceramic polymer, and may be referred to as "ceramic yield." FIG. 5 shows a dramatic improvement in ceramic yield (e.g., a reduction in the loss of mass) of up to nearly 90% when 50 mass % SiC powder is added to the slurry, and somewhat less dramatic improvement when 33 mass % SiC powder is added to the slurry. Table 2 lists the maximum ceramic yield for the three samples measured in FIG. 5, e.g., for ceramics formed using slurries that contain no inclusions ("base polymer"), that contain 33 mass % of inclusions, or that contain 50 mass % of inclusions. The increased ceramic yield for the ceramics having greater mass % of inclusions may be attributed to decreased flaw concentration resulting from improved joint density.

TABLE 2

| Slurry Composition | Ceramic Yield (%) of Ceramic Formed Using Slurry |
| --- | --- |
| Base Polymer | 71 |
| 33 mass % SiC Powder | 83 |
| 50 mass % SiC Powder | 89 |

Thus, by co-selecting the mass % and the shapes of the inclusions, an as-fabricated joint may be obtained having reduced joint porosity and thus, improved joint strength as compared to a joint lacking such inclusions.

Inclusions 104 further may be treated so as to enhance their dispersability in the preceramic polymer slurry, to enhance the extent to which each inclusion retains its characteristics when incorporated into the finished joint, and/or to enhance the joint fracture toughness by promoting inclusion sliding relative to the matrix during joint deformation. For example, the inclusions may include a thin pyrolytic carbon interface coating layer that inhibits the inclusions from being totally subsumed during the crystallization process described further below with reference to step 1050 of method 1000. The slurry may also include one or more binders, vehicles, plasticizers, dispersants, sintering aids, or other processing aids known in the art.

To reinforce and seal the joint, a step of chemical vapor infiltration may be performed after the slurry is completely converted to the desired ceramic polymorph, e.g., β-SiC, to form a sealing layer. Such a step is believed to be important for nuclear grade joints, as the ability to retain helium and fission products requires the joint to be substantially impermeable. In one illustrative embodiment of such a step, β-SiC is deposited by the thermal decomposition reaction of methyltrichlorosilane (MTS) in a hydrogen carrier gas in and onto matrix 103 and articles 101 and 102 to form sealing layer 105 such as illustrated in FIGS. 1A-1B. This reaction may take place over a broad range of suitable temperatures, pressures, and MTS concentrations. Exemplary infiltration conditions range between 800-1400° C., 3-1000 mbar, and MTS partial pressures of 0.01-5.0 mbar. Other conditions, and other CVI reactants, suitably may be used.

Such application of CVI after slurry-derived joining may be referred to as a "hybrid" method, and may further improve the joint and make it nuclear-grade. Indeed, any residual open porosity in the slurry-derived matrix may be used as reactant flow pathways for CVI reactant(s) into the joint and thus partially or fully extend sealing layer 105 into matrix 103. This additional region of sealing layer (e.g., region 106 illustrated in FIGS. 1A-1B) not only increases joint density, but also reduces or eliminates surface flaws by sealing pores and increases overall joint density and strength. Furthermore, additional deposition and infiltration of the sealing layer on regions of articles 101, 102 outside the joint may provide an impermeable barrier to fission products and helium which must be kept within the fuel rod. Existing literature has established that CVD-based SiC layers as thin as 35 micrometers may be sufficient for fission product retention, see Causey et al., "The use of silicon carbide as a tritium permeation barrier," *Journal of Nuclear Materials*, 220-222 (1995), pages 823-826. The CVI processing conditions may be selected to permit significant infiltration of sealing layer 105 into joint 100.

As described in Table 3, an exemplary β-SiC hybrid joint, prepared using a slurry of about 50% β-SiC whiskers in PCS and treated with CVI to form a β-SiC sealing layer, shows a remarkable improvement in both characteristic strength and Weibull modulus as compared with a joint prepared using only the whisker-based PCS slurry, or with PCS alone. The hybrid joint had a characteristic apparent shear strength of about 50.7 MPa, about 239% that of the joint prepared using PCS slurry and about 975% that of the joint prepared using PCS alone. The Weibull modulus of the hybrid joint was about 6.7, about 171% that of the joint prepared using PCS slurry and about 353% that of the joint prepared using PCS alone. Accordingly, the joints provided herein have significantly enhanced mechanical properties than those that may be obtained using previously known methods, and indeed are believed to meet requirements for nuclear applications.

TABLE 3

| Joint Material | Weibull Modulus | Characteristic App. Shear Strength (MPa) |
| --- | --- | --- |
| Hybrid | 6.7 | 50.7 |
| PCS Slurry | 3.9 | 21.2 |
| PCS | 1.9 | 5.2 |

It should be understood that any suitable joint may be prepared according to the present invention, including but not limited to a butt joint such as illustrated in FIGS. 1A-1B, a lap joint, miter joint, box joint, dovetail joint, dado joint, groove joint, tongue and groove joint, or a mortise and tenon joint. Additionally, articles of any suitable shape may be joined, including but not limited to columns, rods, cylinders, tubes, plates, sheets, films, square rods, cones, frustoconical shapes, pyramids, and rhomboids. The articles need not necessarily be the same shape as one another. In one illustrative embodiment, the first article is a hollow tube and the second article is a cap that joint 100 seals to the tube. The tube may be cladding for nuclear fuel material.

Figure 6A:
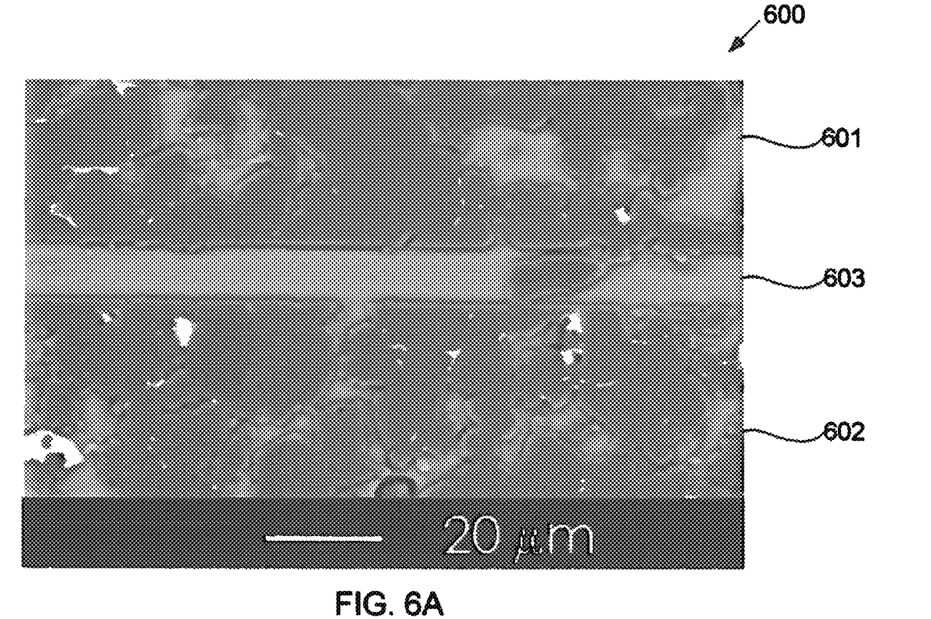
FIGS. 6A and 6B are microscope images of relatively thin and thick β-SiC joints, respectively, prepared according to the method of FIG. 1C.
Figure 6B:
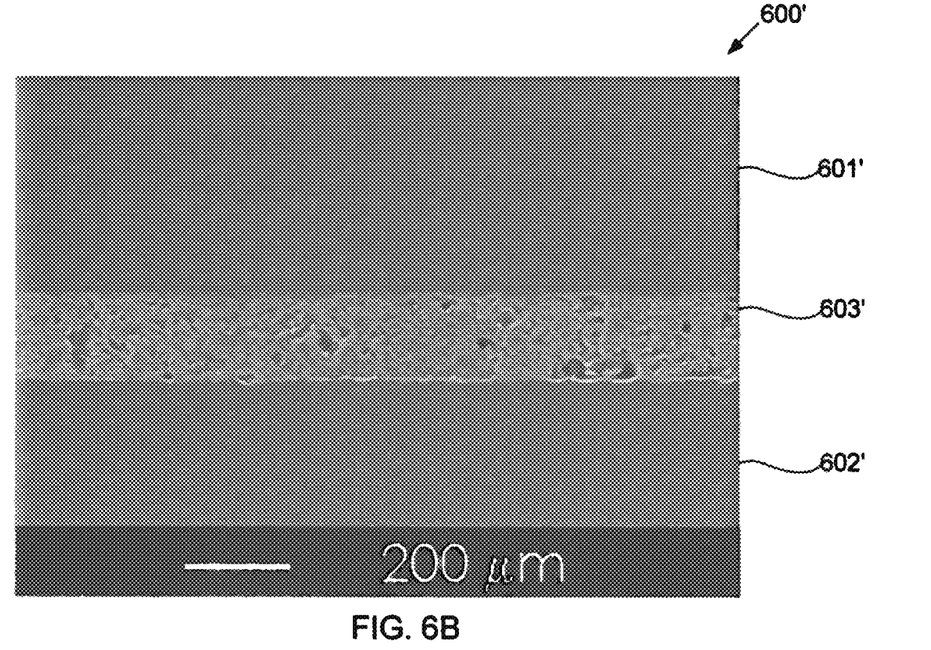

Additionally, joints having a variety of thicknesses suitably may be prepared. Joint thickness is defined by the gap between the articles to be joined, as well as the viscosity of the slurry applied to the joint. Suitable joints having thicknesses between 10-200 microns have been prepared. For example, FIG. 6A is an SEM image of joint 600 between articles 601 and 602 that includes matrix 603 having a thickness of about 10 microns. FIG. 6B is an SEM image of joint 600' between articles 601' and 602' that includes matrix 603' having a thickness of about 200 microns. Thicker and thinner joints also may be prepared.

Although the methods are primarily described with reference to preparation of β-SiC, it should be understood that the methods may suitably adapted to prepare joints for articles formed from other types of materials. For example, other polymorphs of SiC may be joined, as may other ceramics such as silicon nitrides, various oxides and mixtures of the various oxides, including mixtures of the oxides with silicon carbide. Such oxides may include oxides of aluminum, nickel, lanthanum, barium, zinc, lithium, cobalt, cadmium, cerium, chrome, antimony, iron, yttrium, tantalum, tungsten, strontium, calcium, bismuth, tin, manganese, magnesium, zirconium, titanium, lead, niobium, and silicon. Other suitable ceramics include raw mineral materials, such as shale, stoneware, clay, bauxite, kyanite, bentonite, kaolin, pyrophilite, talc, feldspar, nepheline syenite, wollastonite, spodumene, flint (quartz), zircon, zirconates, and corderite, as well as mixtures thereof with other raw mineral materials or with one or more of the ceramic oxides, silicon nitride, and silicon carbide.

All patents and publications mentioned herein are expressly incorporated by reference in their entireties.

While various illustrative embodiments of the invention are described above, it will be apparent to one skilled in the art that various changes and modifications may be made therein without departing from the invention. For example, although the joints, methods, and uses above are primarily described with references to nuclear reactor applications (e.g., nuclear fuel cladding), it should be understood that they suitably may be used for other applications, including heat exchangers. Additionally, although the joints, methods, and uses above are primarily described with reference to the matrix, the plurality of inclusions, the sealing layer, and/or the first and second articles all comprising the same crystal polymorph of the same material, it should be appreciated that some or all of such components may comprise one or more different ceramic polymorphs, or even one or more different materials, than one another. The appended claims are intended to cover all such changes and modifications that fall within the true spirit and scope of the invention.

What is claimed:

1. A method of preparing a joint between first and second articles each comprising a ceramic polymorph, the method comprising:
   (a) preparing a slurry comprising a preceramic polymer and a plurality of inclusions, the inclusions comprising the same ceramic polymorph as the first and second articles;
   (b) applying the slurry between the first and second articles;
   (c) curing the slurry to form a green body;
   (d) pyrolyzing the green body to form a solid ceramic containing the plurality of inclusions;
   (e) crystallizing the solid ceramic to form a crystalline matrix comprising the same ceramic polymorph as the first and second articles, the plurality of inclusions being disposed within the crystalline matrix; and
   (f) reinforcing the joint by applying to the crystalline matrix a substantially gas impermeable sealing layer, the substantially gas impermeable sealing layer comprising the same ceramic polymorph as the first and second articles, the substantially gas impermeable sealing layer being disposed on respective outer surfaces of the first and second articles and penetrating partially or fully into the crystalline matrix.

2. The method of claim 1, wherein the crystalline matrix, the plurality of inclusions, and the substantially gas impermeable sealing layer each consist essentially of the same ceramic polymorph as the first and second articles.

3. The method of claim 1, wherein the inclusions comprise spheres, flakes, whiskers, fibers, or irregular shapes comprising the ceramic polymorph.

4. The method of claim 1, wherein the substantially gas impermeable sealing layer is applied using chemical vapor infiltration.

5. The method of claim 1, wherein the slurry is cured at a first temperature to form the green body, the green body is pyrolyzed at a second temperature higher than the first temperature to form the solid ceramic, and the solid ceramic is crystallized at a third temperature higher than the second temperature.

6. The method of claim 1, wherein the preceramic polymer comprises polycarbosilane.

7. The method of claim 4, wherein applying the chemical vapor infiltration comprises applying silicon-containing and carbon-containing reactant gases in a carrier gas to the first and second articles and to the crystalline matrix.

8. The method of claim 1, further comprising repeating steps (b)-(e) one or more additional times.

9. The method of claim 1, wherein the ceramic polymorph is β-SiC.

10. The method of claim 1, further including coating the inclusions with an interface coating.

11. The method of claim 5, wherein the solid ceramic is crystallized at the third temperature for a sufficient amount of time so as to substantially completely crystallize the solid ceramic.

12. The method of claim 5, wherein the crystalline matrix further comprises cracks, pores, or voids, and wherein the substantially gas impermeable sealing layer penetrates partially or fully into the crystalline matrix via the cracks, pores, or voids.

* * * * *